United States Patent
Chowdhary et al.

(10) Patent No.: US 8,254,974 B2
(45) Date of Patent: Aug. 28, 2012

(54) METHOD FOR FACILITATING TRANSMISSION OF DATA IN A COMMUNICATION SYSTEM

(75) Inventors: Dipendra M. Chowdhary, Hoffman Estates, IL (US); Thomas B. Bohn, McHenry, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 288 days.

(21) Appl. No.: 12/635,225

(22) Filed: Dec. 10, 2009

(65) Prior Publication Data

US 2011/0143797 A1 Jun. 16, 2011

(51) Int. Cl.
*H04B 7/00* (2006.01)

(52) U.S. Cl. .... 455/509; 455/62; 455/67.11; 455/67.13; 455/450; 455/451; 455/453; 455/561; 455/502; 455/512; 455/444; 455/442; 455/513; 455/431; 455/13; 370/254; 370/338; 370/331; 370/329; 375/141; 375/130; 375/140; 375/146; 375/147

(58) Field of Classification Search .................. 455/509, 455/517, 500, 62, 452.1, 452.2, 450, 451, 455/453, 67.11, 67.13, 561, 502, 512, 13, 455/431, 442, 444; 370/329, 254, 331, 338; 375/141, 130, 140, 146, 147
See application file for complete search history.

(56) References Cited

U.S. PATENT DOCUMENTS

| | | | | |
|---|---|---|---|---|
| 6,163,698 A * | 12/2000 | Leitch et al. | .................. | 455/450 |
| 6,230,255 B1 * | 5/2001 | Asghar et al. | .................. | 712/32 |
| 6,308,079 B1 | 10/2001 | Pan et al. | | |
| 6,480,525 B1 * | 11/2002 | Parsa et al. | .................... | 375/141 |
| 7,522,924 B2 * | 4/2009 | Abeta et al. | ................. | 455/452.2 |
| 2007/0032241 A1 * | 2/2007 | Busch et al. | .................. | 455/450 |
| 2009/0111497 A1 | 4/2009 | Bitter et al. | | |
| 2010/0142405 A1 * | 6/2010 | Cai et al. | ........................ | 370/254 |
| 2010/0278165 A1 * | 11/2010 | Kono | ............................ | 370/338 |
| 2011/0243086 A1 * | 10/2011 | Ono | ............................. | 370/329 |

FOREIGN PATENT DOCUMENTS

KR 20070064256 A 6/2007

OTHER PUBLICATIONS

International Search Report and Written Opinion for International Application No. PCT/US2010/056841 mailed on Jun. 23, 2011.

* cited by examiner

*Primary Examiner* — Temesgh Ghebretinsae
*Assistant Examiner* — Md Talukder
(74) *Attorney, Agent, or Firm* — Randi L. Karpinia; Daniel R. Bestor (57) ABSTRACT

A method for facilitating transmission of data in a communication system is provided herein. In operation, a base radio of a plurality of base radios combines status information corresponding to a plurality of inbound frequencies and transmits the combined status information on a single outbound radio frequency. Further, each of the plurality of inbound radio frequencies corresponds to one of the plurality of base radios. Then, one or more radio terminals monitor the single outbound radio frequency to receive the combined status information, determine at least one available inbound radio frequency from the plurality of inbound radio frequencies based on the received combined status information, selects an inbound radio frequency of the at least one available inbound frequency, and transmitting the data using the selected inbound radio frequency to the corresponding base radio.

19 Claims, 6 Drawing Sheets

METHOD FOR FACILITATING TRANSMISSION OF DATA IN A COMMUNICATION SYSTEM

FIELD OF THE DISCLOSURE

The present disclosure relates generally to wireless communication systems and more particularly to a method for facilitating transmission of data in a communication system.

BACKGROUND

With the increasing prevalence of various wireless-applications, it has become desirable to use the wireless communication channel bandwidth as efficiently as possible. Particularly, in applications using unconfirmed data communication, the data mostly flows in one direction, e.g. from the terminal to the infrastructure equipment. Also, the data communication is mostly periodic. As such, this may result in an inefficient utilization of the bandwidth as the outbound frequency channel from the infrastructure equipment to the terminal may remain idle for a long duration of time.

For example, in applications using unconfirmed location updates, the location of a radio terminal is used for tracking its user. Such location data is periodic and flows from the radio to a location server. Often, the periodic location updates are a significant portion of the total data transmissions in a communication system. To reduce the effects of frequent location updates over voice communication, one or more transmission channels can be dedicated exclusively for location updates. Normally, each Global Positioning System (GPS) revert repeater in such a GPS based system uses two frequencies; one for inbound communication and one for outbound. Further, each GPS revert receiver uses the outbound frequency for transmitting its own status information to the radio terminals. Therefore, the frequency channels of conventional systems are inefficiently utilized.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method for facilitating transmission of data in a communication system is provided herein. In operation, a base radio of a plurality of base radios combines status information corresponding to a plurality of inbound radio frequencies and transmits the combined status information on a single outbound radio frequency. Further, each of the plurality of inbound radio frequencies corresponds to one of the plurality of base radios. Then, one or more radio terminals monitor the single outbound radio frequency to receive the combined status information, determine at least one available inbound radio frequency from the plurality of inbound radio frequencies based on the received combined status information, selects an inbound radio frequency of the at least one available inbound frequency, and transmits the data using the selected inbound radio frequency to the corresponding base radio.

Figure 1:
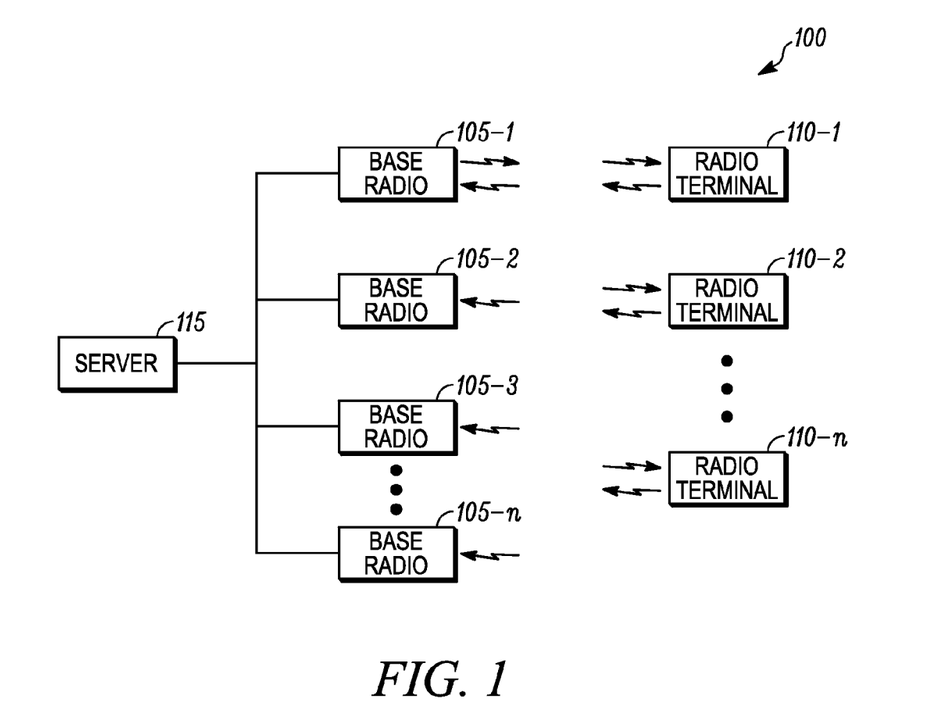
FIG. 1 is a simplified block diagram of a communication system for communicating information between a plurality of base radios and one or more radio terminals in accordance with some embodiments.

FIG. 1 is a simplified block diagram of a communication system 100 for communicating data between a plurality of base radios 105-*n* and one or more radio terminals 110-*n* in accordance with some embodiments. The communication system 100 can be, for example, any two-way radio communication network. Also, the communication network may include one or more of private networks, public networks, such as the Internet, wireless networks, such as satellite and cellular networks, and local area wireless networks, such as Wireless Fidelity (WiFi) or Bluetooth networks, Local Area Networks (LANs), Wide Area Networks (WANs), telephone networks, such as the Public Switched Telephone Networks (PSTN), or a combination of networks. Further, the communication system 100 comprises a plurality of base radios 105-1 through 105-*n* and one or more radio terminals 110-1 through 110-*n*. The plurality of base radios 105-1 through 105-*n* may be any fixed or wireless communication station. The plurality of base radios 105-1 through 105-*n* can be any infrastructure equipment such as a base station or radio base station or an access point base station, or the like. The four base radios and the three radio terminals have been illustrated for simplicity. In practice, there may be more or less base radios and radio terminals. Further, it is to be understood that the communication system 100 is only a general representation of communications among devices and thus, may include multiple communication means and/or multiple communication networks. In fact, the communication system 100 may include multiple, distinct networks that have no connection with one another and/or no common communication means. Further, the one or more radio terminals 110-1 through 110-*n* can comprise any radio communication devices, such as mobile phones, minicomputers, desktop computers, laptops, notebook computers, personal digital assistants, or the like.

In accordance with embodiments, at least one of the base radios (e.g. base radio 105-1) of the plurality of base radios 105-1 through 105-*n* is operated to receive status information of a plurality of inbound frequencies, combine the status information, and transmit the combined status information to the one or more radio terminals 110-1 through 110-*n*. The base radio 105-1 is assigned an outbound frequency for transmitting the combined status information. Further, the base radio 105-1 can also be referred to as an assigned base radio, a single base radio or a designated base radio.

As used herein, the status information comprises information including but not limited to a color code verification, a slot synchronization, and an operational activity state of the plurality of base radios 105-1 through 105-*n*. As used herein, the term operational activity comprises information related to a busy or an idle state of the plurality of base radios. As used herein, the outbound frequency refers to a radio frequency used by the base radio 105-1 for transmitting status information to the one or more radio terminals 110-1 through 110-*n*. The base radio 105-1 combines the status information related to the plurality of inbound frequencies received from the plurality of base radios and transmits the combined status information over the outbound frequency. The outbound frequency is known to and monitored, by the one or more radio terminals 110-1 through 110-*n*, to receive the combined status information related to the plurality of inbound frequencies. Further as used herein, the plurality of inbound frequencies refer to radio frequencies used by the plurality of base radios 105-1 through 105-*n* for receiving the data from the one or more radio terminals 110-1 through 110-*n*. Also, each of the plurality of inbound frequencies corresponds to a base radio of the plurality of base radios 105-1 through 105-*n*, including the base radio 105-1. For example, for 'n' inbound radio frequencies (f1, f2, . . . fn), frequency f1 corresponds to the base radio 105-1, frequency f2 corresponds to base radio 105-2, and so on frequency fn corresponds to base radio 105-*n*. Further, in accordance with some embodiments, the outbound frequency and the plurality of inbound frequencies can be fixed or pre-configured frequencies which are known to the plurality of base radios 105-1 through 105-*n* and the one or more radio terminals 110-1 through 110-*n*.

In accordance with an alternate embodiment, each of the plurality of inbound frequencies corresponds to base radios other than the base radio 105-1. As such, in this embodiment the base radio 105-1 is enabled only to transmit over the outbound frequency.

Further in communication system 100, the one or more radio terminals 110-1 through 110-*n* monitor the outbound frequency to determine at least one available inbound frequency of the plurality of inbound frequencies for transmitting data to at least one base radio of the plurality of base radios 105-1 through 105-*n*. The data can be any traffic data such as location update information, text message, telemetry data, and the like. Further, the data can be unconfirmed data. As used herein, unconfirmed data refers to transmission of data which do not require acknowledgment of a correct reception of the data from a recipient. Further as used herein, an available inbound frequency refers to an inbound frequency with the status information indicating that the inbound frequency is currently unused or is an idle state. The one or more radio terminals 110-1 through 110-*n* then select an inbound frequency to transmit the data to a base radio (for example 105-2) corresponding to the selected available inbound frequency. As such, this method enables reduction in the number of frequencies required for transmitting the status information and ensures improved utilization of the wireless communication channel bandwidth.

Furthermore, the corresponding base radio 105-2 can then transmit the data received from the one or more radio terminals 110-1 through 110-*n* to one or more servers 115. In accordance with some embodiments, the server 115, for example, can be a location server used for tracking the location of the one or more radio terminals 110-1 through 110-*n*.

In accordance with some embodiments, the communication system 100 implements a Time Division Multiple Access (TDMA) communication. As such, the plurality of base radios 105-1 through 105-*n* are required to be synchronized with each other. The synchronization can be achieved by providing the slot synchronization output of the base radio 105-1 to a base radio wired interface 225. The wired interface can be for example a General Purpose Input/Output (GPIO) line. Other base radios of the plurality of base radios 105-1 through 105-*n* then maintain their slots synchronized with the GPIO line. Alternatively, the synchronization can be achieved using a time provided by a GPS receiver, a time provided by a Network Time Protocol (NTP) and the like. Further, in accordance with some embodiments the TDMA communication is in accordance with the European Telecommunications Standards Institute-Digital Mobile Radio (ETSI-DMR) Standards (ETSI TS 102 361). The ETSI standards referred to herein may be obtained at http://www.etsi.org/WebSite/Technologies/DigitalMobileRadio.aspx/.

Figure 2:
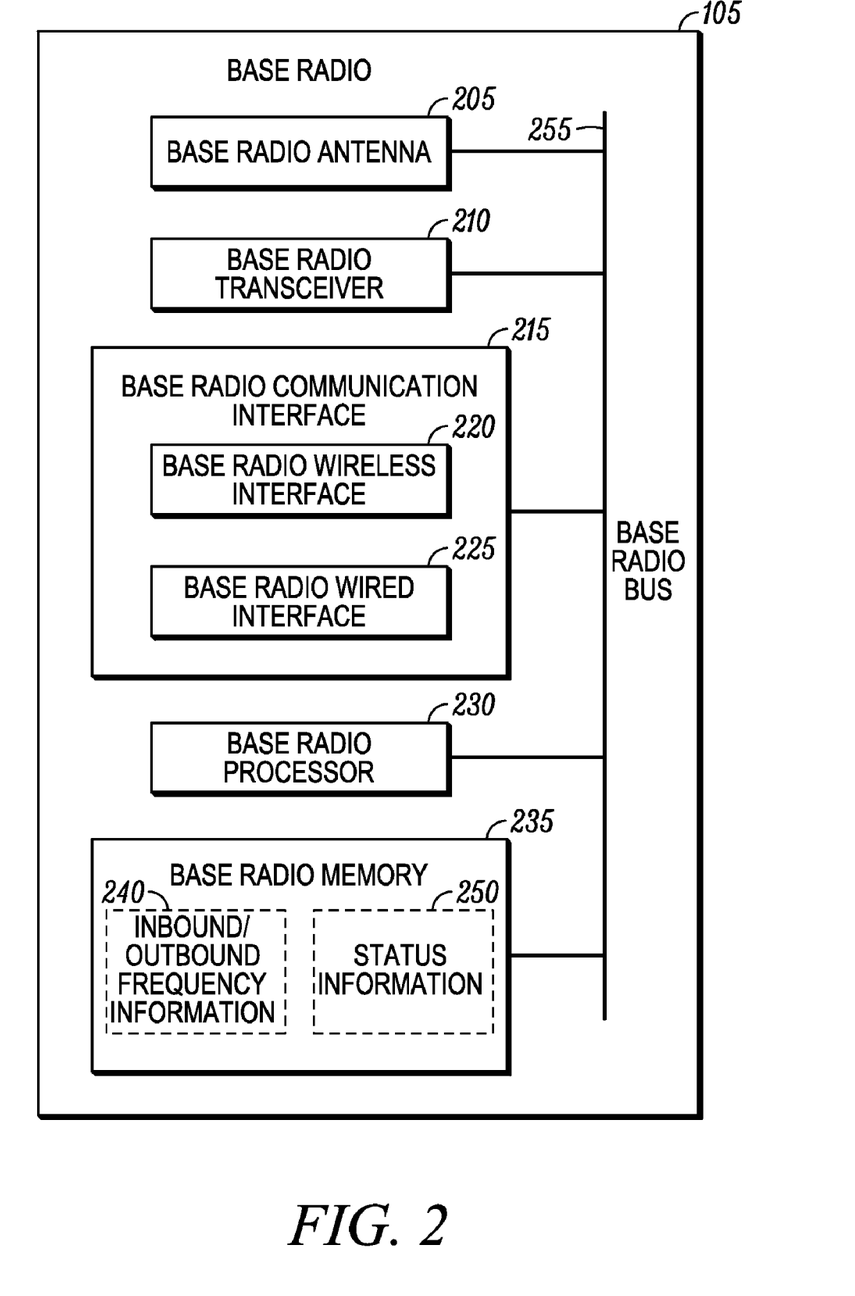
FIG. 2 is a block diagram further illustrating a detailed view of a base radio employed in the communication system as shown in FIG. 1 in accordance with some embodiments.

FIG. 2 is a block diagram further illustrating a detailed view of a base radio 105 employed in the communication system 100 as shown in FIG. 1 in accordance with some embodiments. It will be appreciated by those of ordinary skill in the art that the base radio 105 as illustrated and described herein is only one example and as such is not intended to suggest any limitation as to the scope of use or functionality of the invention. Other well known configurations that may be suitable for use with the invention include, but are not limited to, personal computers (PCs), server computers, multiprocessor systems, microprocessor-based systems, programmable consumer electronics, network PCs, minicomputers, mainframe computers, distributed computing environments that include any of the above systems or devices, and the like.

The base radio 105 comprises a base radio antenna 205, a base radio transceiver 210, a base radio communication interface 215, a base radio processor 230, a base radio memory 235, and a base radio bus 255. The base radio transceiver 210 is configured to communicate via the base radio communication interface 215. The base radio communication interface 215 further comprises a base radio wireless interface 220 and a base radio wired interface 225. The base radio transceiver 210 is further configured to transmit a combined status information to one or more radio terminals 110-1 through 110-*n* over an outbound frequency using the base radio wireless interface 220 and receive data from the one or more radio terminals 110-1 through 110-*n* over at least one of a plurality of inbound frequencies using the base radio wireless interface 220. Furthermore, the base radio transceiver 210 is configured to transmit the data to the server 115 and also receive status information of the plurality of base radios 105-1 through 105-*n* using the base radio wired interface 225. The base radio processor 230 is configured to combine the status information received from the plurality of base radios. The base radio processor 230 is further configured to control the base radio transceiver 210 to communicate with the one or more radio terminals 110-1 through 110-*n*, the plurality of base radios 105-2 through 105-*n*, and the server 115. The base radio memory 235 comprises information related to the inbound and outbound frequencies 240 and status information 250 of the plurality of base radios. Further, the base radio bus 255 is configured to enable communication between a base radio antenna 205, a base radio transceiver 210, a base radio communication interface 215, a base radio processor 230, and a base radio memory 235.

The base radio processor 230 includes one or more microprocessors, microcontrollers, Digital Signal Processors (DSPs), state machines, logic circuitry, or any other device or devices that process information based on operational or programming instructions. Such operational or programming instructions are stored in the base radio memory 235.

Depending on the exact configuration and type of base radio, the base radio memory 235 may be volatile (such as random access memory (RAM)), non-volatile (such as a hard disk, ROM, flash memory, etc.) and most often some combination of the two. Additionally, the base radio 105 may also have additional features/functionality. For example, the base radio 105 may also include additional storage (removable and/or non-removable) including, but not limited to, magnetic or optical disks or tape. Such additional storage may be removable storage and/or non-removable storage. The base radio memory 235 can be an Integrated Circuit (IC) memory chip containing any form of Random-Access Memory (RAM) or Read-Only Memory (ROM), a floppy disk, a Compact Disk Read-Only Memory (CD-ROM), a hard disk drive, a Digital Video Disc (DVD), a flash memory card, external subscriber identity module (SIM) card or any other medium for storing digital information. One of ordinary skill in the art will recognize that when the base radio processor 230 has one or more of its functions performed by a state machine or logic circuitry, the base radio memory 235 containing the corresponding operational instructions can be embedded within the state machine or logic circuitry.

Figure 3:
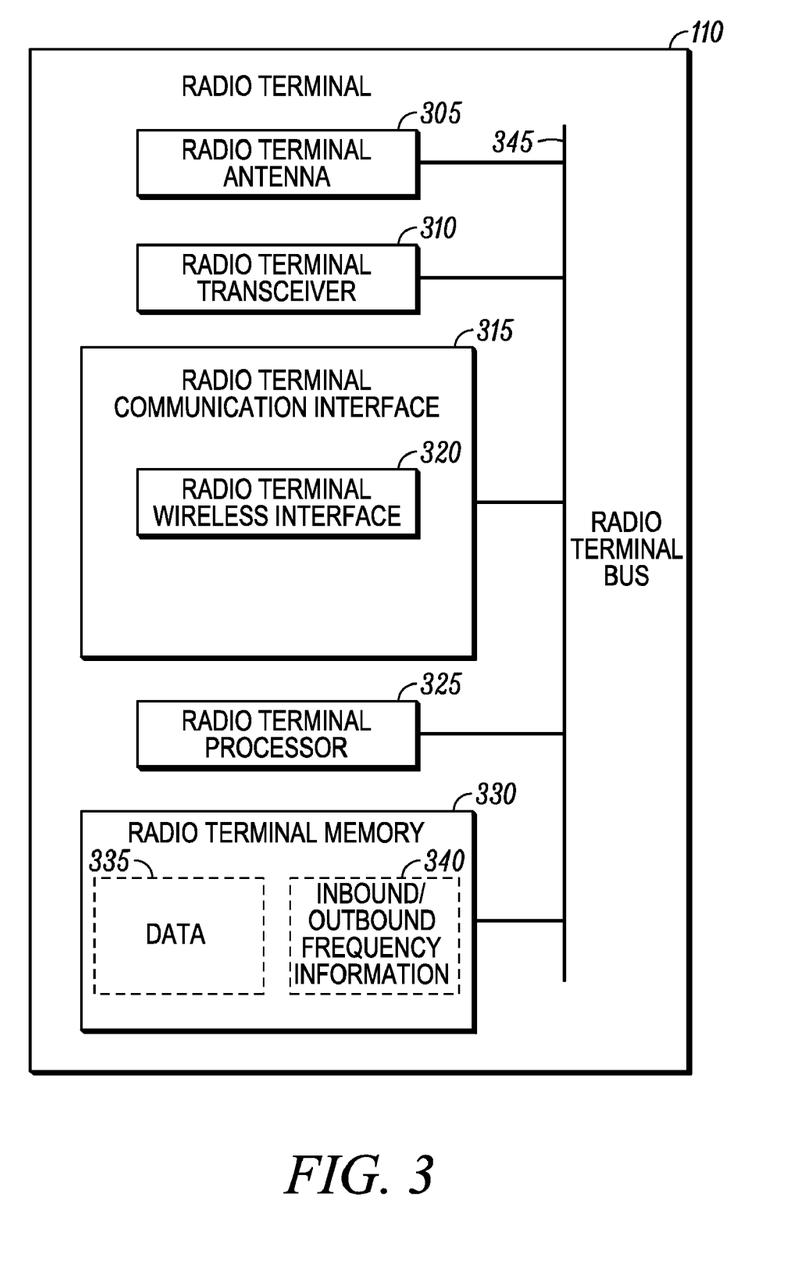
FIG. 3 is a block diagram further illustrating a detailed view of a radio terminal employed in the communication system as shown in FIG. 1 in accordance with some embodiments.

FIG. 3 is a block diagram further illustrating a detailed view of a radio terminal 110 employed in the communication system 100 as shown in FIG. 1 in accordance with some embodiments. It will be appreciated by those of ordinary skill in the art that the radio terminal 110 as illustrated and described herein is only one example and as such is not intended to suggest any limitation as to the scope of use or functionality of the invention. Other well known configurations that may be suitable for use with the invention include, but are not limited to, personal computers (PCs), server computers, multiprocessor systems, microprocessor-based systems, programmable consumer electronics, network PCs, minicomputers, mainframe computers, distributed computing environments that include any of the above systems or devices, and the like.

FIG. 3 illustrates the radio terminal 110 comprising a radio terminal antenna 305, a radio terminal transceiver 310, a radio terminal communication interface 315, a radio terminal processor 325, a radio terminal memory 330, and a radio terminal bus 345. The radio terminal transceiver 310 is configured to wirelessly communicate with the plurality of base radios 105-1 through 105-n using the radio terminal communication interface 315. The radio terminal communication interface 315 comprises a radio terminal wireless interface 320 to enable the wireless communication. The radio terminal transceiver 310 is configured to receive the combined status information from a base radio (for example 105-1) of the plurality of base radios 105-1 through 105-n, and then transmit location data to at least one base radio corresponding to an available inbound frequency. The radio terminal processor 325 controls the radio terminal 110 to monitor the outbound frequency for information related to the status of the plurality of inbound frequencies. On receiving the combined status information, the radio terminal processor 325 is further configured to determine at least one available inbound frequency based on the combined status information and then select an inbound frequency from the at least one available inbound frequency. Further, the radio terminal memory 330 is configured to store data 335 and information related to the outbound frequency and inbound frequency 340, wherein the outbound frequency is monitored to receive status information of the plurality of base radios 105-1 through 105-n, and the plurality of inbound frequencies can be used to transmit data when determined to be available. Further, the radio terminal bus 345 is configured to enable communication between a radio terminal antenna 305, a radio terminal transceiver 310, a radio terminal communication interface 315, a radio terminal processor 325, and a radio terminal memory 330.

The radio terminal processor 325 includes one or more microprocessors, microcontrollers, Digital Signal Processors (DSPs), state machines, logic circuitry, or any other device or devices that process information based on operational or programming instructions. Such operational or programming instructions are stored in the radio terminal memory 330.

Depending on the exact configuration and type of base radio, the radio terminal memory 330 may be volatile (such as random access memory (RAM)), non-volatile (such as a hard disk, ROM, flash memory, etc.) and most often some combination of the two. Additionally, the radio terminal 110 may also have additional features/functionality. For example, the radio terminal 110 may also include additional storage (removable and/or non-removable) including, but not limited to, magnetic or optical disks or tape. Such additional storage may be removable storage and/or non-removable storage. The radio terminal memory 330 can be an Integrated Circuit (IC) memory chip containing any form of Random-Access Memory (RAM) or Read-Only Memory (ROM), a floppy disk, a Compact Disk Read-Only Memory (CD-ROM), a hard disk drive, a Digital Video Disc (DVD), a flash memory card, external subscriber identity module (SIM) card or any other medium for storing digital information. One of ordinary skill in the art will recognize that when the radio terminal processor 325 has one or more of its functions performed by a state machine or logic circuitry, the radio terminal memory 330 containing the corresponding operational instructions can be embedded within the state machine or logic circuitry.

Figure 4:
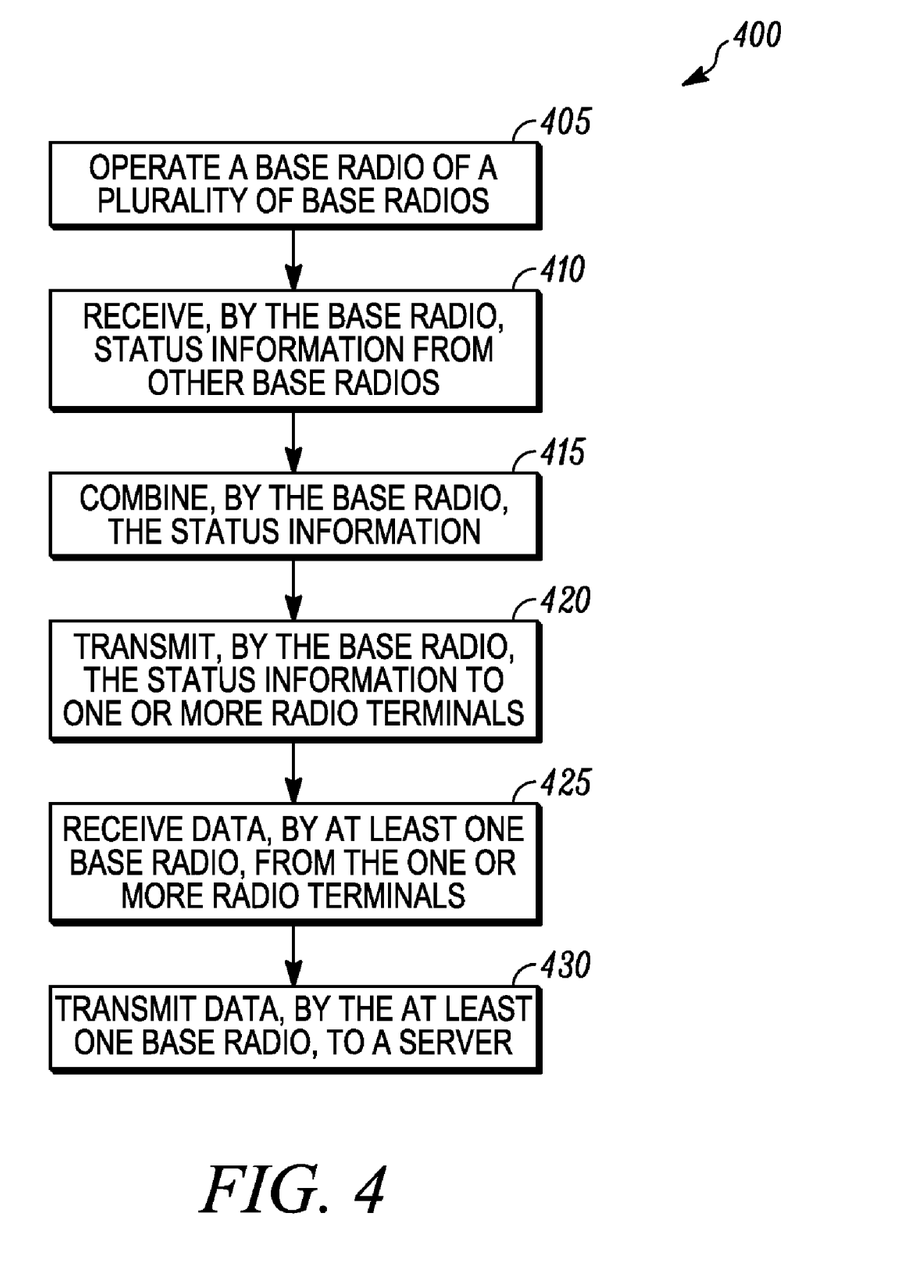
FIG. 4 is a flowchart illustrating a method of operation of a base radio for communicating with one or more radio terminals in accordance with some embodiments.

FIG. 4 is a flowchart illustrating a method 400 of operation of a plurality of base radios 105-1 through 105-n for communicating with one or more radio terminals 110-1 through 110-n in accordance with some embodiments. At block 405, a base radio (for example 105-1) of the plurality of base radios 105-1 through 105-n is designated to transmit status information to the one or more radio terminals 110-1 through 110-n over an assigned outbound frequency. At block 410, the base radio 105-1 receives the status information from other base radios 105-2 through 105-n of the plurality of base radios 105-1 through 105-n. In accordance with an embodiment, the other base radios 105-2 through 105-n transmit their status information to the base radio 105-1 via a base radio wired interface 225. At block 415, the base radio 105-1 combines the status information related to a plurality of inbound frequencies, wherein each inbound frequency corresponds to one of the base radios 105-1 through 105-n. Specifically, the base radio 105-1 combines the status information, received from the other base radios 105-2 through 105-n, and its own status information. At block 420, the base radio 105-1 then transmits the combined status information over the outbound frequency to the one or more radio terminals 110-1 through 110-n. At block 425, at least one base radio (for example 105-2) of the plurality of base radios 105-1 through 105-n receive data from the one or more radio terminals 110-1 through 110-n. At block 430, the at least one base radio 105-2 of the plurality of base radios 105-1 through 105-n then transmits the data received from the one or more radio terminals 110-1 through 110-*n* to a server 115. Further, the data can be transmitted to the server 115 via the base radio wired interface 225 or via a base radio wireless interface 220. In accordance to some embodiments, the server 115 is a location server that maintains a database of location and other information pertaining to the one or more radio terminals 110-1 through 110-*n* for tracking the location of the one or more radio terminals 110-1 through 110-*n*.

Although the method 400 is shown as a sequence of steps 405-430, one or more steps can be executed concurrently. For example, a base radio 105 can transmit/receive status information while concurrently receiving the data from the one or more radio terminals 110-1 through 110-*n*.

Figure 5:
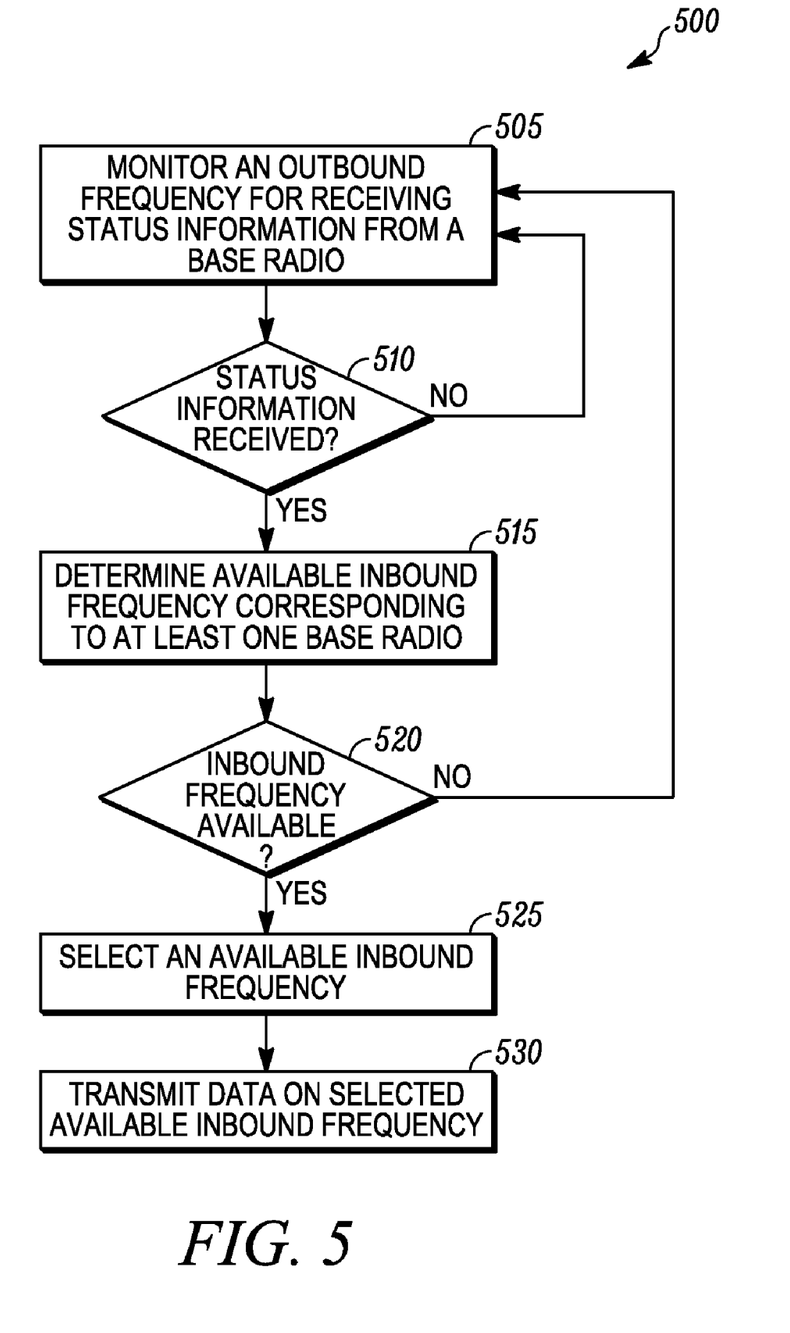
FIG. 5 is a flowchart illustrating a method of operation of one or more radio terminals for communicating with a plurality of base radios in accordance with some embodiments.

FIG. 5 is a flowchart illustrating a method 500 of operation of a radio terminal 110 for communicating with a plurality of base radios 105-1 through 105-*n* in accordance with some embodiments. At block 505, the radio terminal 110 monitors an outbound frequency to receive status information from a base radio (for example 105-1) of the plurality of base radios 105-1 through 105-*n*. The status information provides information pertaining to a plurality of inbound frequency that can be used by the radio terminal 110 for transmitting data to the plurality of base radios 105-1 through 105-*n*. At block 510, the radio terminal 110 determines whether the combined status information is received. When it is determined that no combined status information is received, the radio terminal 110 returns to block 405 and continues to monitor the outbound frequency. When it is determined that the combined status information is received, then at block 515 the radio terminal 110 determines, based on the received status information, whether at least one inbound frequency is available to transmit the data.

At block 520, the radio terminal 110 determines whether at least one inbound frequency is available. When it is determined that no inbound frequency is available, then the radio terminal 110 returns to block 505 and continues to monitor the outbound frequency. When at block 520 it is determined that at least one inbound frequency is available, then at block 525 the radio terminal 110 selects an available inbound frequency from the at least one available inbound frequency. At block 530, the radio terminal 110 transmits the location update data over the selected available inbound frequency to a corresponding base radio.

Figure 6:
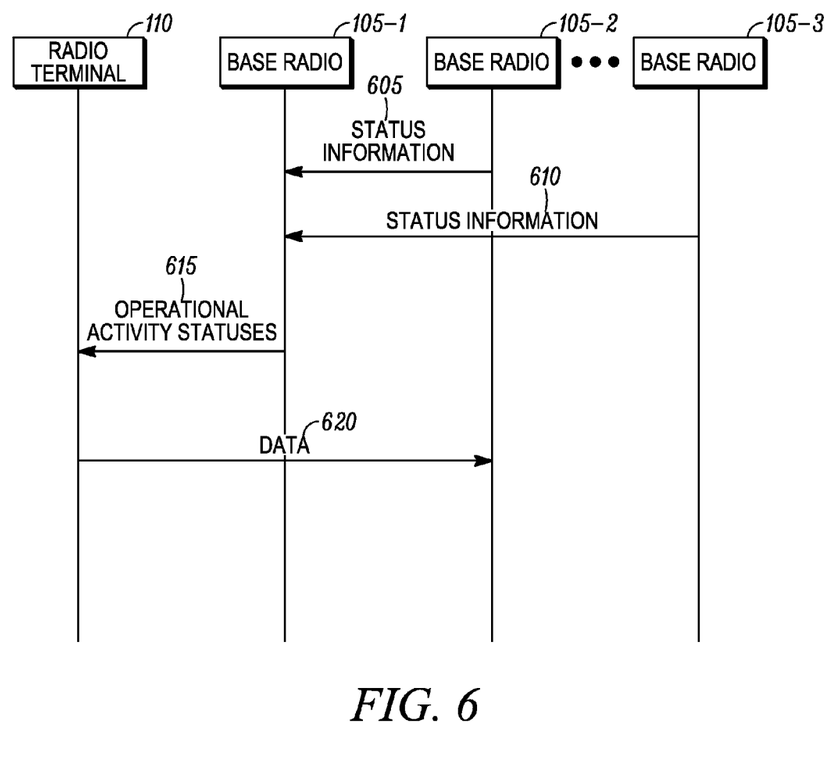
FIG. 6 is a signal flow diagram illustrating an exchange of signals between a plurality of base radios and a radio terminal in accordance with some embodiments.

FIG. 6 is a signal flow diagram illustrating an exchange of signals between a plurality of base radios 105-1, 105-2, 105-3 and a radio terminal 110 in accordance with some embodiments. FIG. 6 illustrates a base radio 105-1 receiving status information 605, 610 from other base radios 105-2 and 105-3, respectively. The base radio 105-1 combines the status information 605, 610 to form operational activity statuses 615 and transmits the operational activity statuses 615 to the radio terminal 110 over the outbound frequency. The operational activity statuses 615 include a busy or idle state of the other base radios 105-2, 105-3 determined from the status information 605, 610. Further, in accordance with some embodiments the base radio 105-1 can also include its own busy or idle state information in the operational activity statuses 615 in order to receive data from the radio terminal 110 over its corresponding inbound frequency. The radio terminal 110 tunes to and monitors the outbound frequency to receive the operational activity statuses 615 from the base radio 105-1. On receiving the operational activity statuses 615, the radio terminal 110 selects an available inbound frequency with an idle state determined based on the operational activity statuses 615. Next, the radio terminal 110 transmits the data over the selected available inbound frequency to a corresponding base radio (for example 105-2).

In accordance with embodiments described above, the present invention provides a method for communication of data between a plurality of base radios 105-1 through 105-*n* and one or more radio terminals 110-1 through 110-*n*. In conventional methods, each base radio uses an outbound frequency and an inbound frequency, i.e. the inbound frequency to receive data and the outbound frequency for transmitting status information. The embodiments described above reduce the number of radio frequencies used for transmitting the status information by combining multiple outbound frequencies into a single outbound frequency. The single outbound frequency is used to transmit the status information related to a plurality of inbound frequencies, to the one or more radio terminals 110-1 through 110-*n*. As such, this results in saving one frequency per base radio, which almost doubles the capacity of the communication system. Further, since all frequencies except one are used for transporting data wirelessly; the capacity improvements for two base radios is 50%, for three base radios is 66%, for four base radios is 75% and so on. Alternatively, the embodiments as described above can be used to for saving frequencies while retaining the same capacity. For example, for 10 base radios there are 10 inbound frequencies and 1 outbound frequency, and therefore the system uses only 11 frequencies. The traditional system, on the other hand, uses a total of 20 frequencies. As such, the method enables saving of 9 frequencies or 45% of frequencies. Further, the embodiments described above results in the one or more radio terminals 110-1 through 110-*n* being able to receive the statuses of the plurality of base radios 105-1 through 105-*n* over just one frequency, instead of having to monitor a plurality of frequencies.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for facilitating transmission of uplink data in a radio communication system, the method comprising:
   receiving, at an assigned base radio out of a plurality of interconnected base radios, status information from each of the other base radios out of the plurality of interconnected base radios, the status information including at least an operational activity state of at least one inbound radio frequency at each of the corresponding ones of the other base radios;
   combining, at the assigned base radio, the status information received from each of the other base radios,
   transmitting, at the assigned base radio, the combined status information on a single outbound radio frequency for receipt by a plurality of radio terminals;
   monitoring, at each of the plurality of radio terminals, the single outbound radio frequency and receiving, at each of the plurality of radio terminals, the combined status information over the single outbound radio frequency;
   determining, at a first one of the plurality of radio terminals, an available inbound radio frequency associated with a particular one of the plurality of interconnected base radios based on the received combined status information;
   selecting, at the first radio terminal, the available inbound radio frequency; and
   transmitting, at the first radio terminals, the uplink data to the particular one of the plurality of interconnected base radios using the available inbound radio frequency.

2. The method claimed in claim 1, further comprising receiving, at a server, the uplink data from the particular one of the plurality of interconnected base radios.

3. The method claimed in claim 1, further comprising synchronizing communications between the single outbound radio frequency and the plurality of inbound radio frequencies.

4. The method claimed in claim 1, wherein the status information further includes information for each of the plurality of base radios related to one or more of a color code verification and a slot synchronization, and wherein the operational activity state comprises one of a busy state and an idle state.

5. The method claimed in claim 1, wherein the step of receiving the status information from each of the other base radios out of the plurality of interconnected base radios comprises the assigned base radio receiving the status information via a wired interface.

6. The method claimed in claim 1, wherein the single outbound radio frequency and the plurality of inbound radio frequencies are fixed frequencies.

7. The method claimed in claim 1, wherein the uplink data comprises location information of the first radio terminals.

8. A system for facilitating transmission of data in a communication network, the system comprising:
   a plurality of base radios, wherein at least one base radio comprises:
      a base radio processor to combine status information corresponding to a plurality of inbound frequencies, wherein each of the plurality of inbound radio frequencies corresponds to one of the plurality of base radios, and
      a base radio transceiver to transmit the combined status information on a single outbound radio frequency; and
   one or more radio terminals comprising
      a radio terminal processor to monitor the single outbound radio frequency to receive the combined status information,
      the radio terminal processor to determine, based on the combined status information, at least one available inbound radio frequency from the plurality of inbound radio frequencies,
      the radio terminal processor to select an inbound radio frequency of the at least one available inbound frequency, and
      a radio terminal transceiver to transmit the data using the available inbound radio frequency to the corresponding base radio of the plurality of base radios.

9. A system for facilitating transmission of uplink data in a radio communication network, the system comprising:
   a plurality of interconnected base radios, wherein at least one assigned base radio comprises:
      a base radio transceiver configured to receive status information from each of the other base radios out of the plurality of interconnected base radios, the status information including at least an operational activity state of at least one inbound radio frequency at each of the corresponding ones of the other base radios;
      a base radio processor configured to combine the received status information into combined status information, and
      the base radio transceiver configured to transmit the combined status information on a single outbound radio frequency for receipt by a plurality of radio terminals; and
   a particular one of the plurality of radio terminals comprising:
      a radio terminal processor configured to monitor the single outbound radio frequency and to receive the combined status information over the single outbound radio frequency,
      the radio terminal processor configured to determine an available inbound radio frequency associated with a particular one of the plurality of interconnected base radios based on the received combined status information;
      the radio terminal processor configured to select the available inbound radio frequency, and a radio terminal transceiver configured to transmit the uplink data to the particular one of the plurality of interconnected base radios using the available inbound radio frequency.

10. The system claimed in claim 9, wherein the status information comprises information for each of the plurality of base radios related to one or more of a color code verification, a slot synchronization, and an operational activity state, wherein the operational activity state comprises one of a busy state and an idle state.

11. The system claimed in claim 9, wherein the plurality of inbound frequencies are synchronized with the single outbound radio frequency.

12. The system claimed in claim 9, wherein at least one other base radio of the plurality of base radios transmit the status information to the base radio via a wired interface.

13. The system claimed in claim 9, wherein the single outbound radio frequency and the plurality of inbound radio frequencies are fixed frequencies.

14. The system claimed in claim 9, wherein the uplink data comprises location information of the particular radio terminals.

15. The method claimed in claim 1, wherein the particular one of the plurality of interconnected base radios is different from the assigned base radio.

16. The method claim in claim 1, wherein the single outbound frequency is shared amongst the plurality of radio terminals such that a separate outbound frequency is not assigned for each of the plurality of radio terminals.

17. The system claimed in claim 9, further comprising:
a server operating to receive the data from the corresponding base radio.

18. The system claimed in claim 17, wherein the particular one of the plurality of interconnected base radios is different from the assigned base radio.

19. The system claim in claim 9, wherein the single outbound frequency is shared amongst the plurality of radio terminals such that a separate outbound frequency is not assigned for each of the plurality of radio terminals.

* * * * *

UNITED STATES PATENT AND TRADEMARK OFFICE
CERTIFICATE OF CORRECTION

| | | |
|---|---|---|
| PATENT NO. | : 8,254,974 B2 | |
| APPLICATION NO. | : 12/635225 | |
| DATED | : August 28, 2012 | |
| INVENTOR(S) | : Chowdhary et al. | |

It is certified that error appears in the above-identified patent and that said Letters Patent is hereby corrected as shown below:

In Column 12, Lines 2-3, Claim 14, delete "terminals." and insert -- terminal. --, therefor.

In Column 12, Line 7, Claim 16, delete "claim in" and insert -- claimed in --, therefor.

In Column 12, Line 16, Claim 19, delete "claim in" and insert -- claimed in --, therefor.

Signed and Sealed this
Fifth Day of February, 2013

Teresa Stanek Rea
*Acting Director of the United States Patent and Trademark Office*